(12) United States Patent
Sakata et al.

(10) Patent No.: US 7,319,821 B2
(45) Date of Patent: Jan. 15, 2008

(54) CHROMATIC DISPERSION GENERATING APPARATUS

(75) Inventors: Yuji Sakata, Kawasaki (JP); Yasuhiro Yamauchi, Kawasaki (JP); Hirohiko Sonoda, Yokohama (JP); Shinichi Wakana, Kawasaki (JP); Hideo Okada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 481 days.

(21) Appl. No.: 11/094,743

(22) Filed: Mar. 31, 2005

(65) Prior Publication Data

US 2006/0140637 A1 Jun. 29, 2006

(30) Foreign Application Priority Data

Dec. 28, 2004 (JP) ............................. 2004-381010

(51) Int. Cl.
  *H04B 10/12* (2006.01)
(52) U.S. Cl. .................. 398/147; 398/188; 398/192
(58) Field of Classification Search ................ 398/81, 398/147–148, 188, 192–194
  See application file for complete search history.

(56) References Cited

U.S. PATENT DOCUMENTS

| | | | |
|---|---|---|---|
| 3,832,030 A | 8/1974 | Gloge | |
| 4,655,547 A | 4/1987 | Heritage et al. | |
| 4,820,019 A | 4/1989 | Yoshida et al. | |
| 5,309,456 A | 5/1994 | Horton | |
| 5,930,045 A | 7/1999 | Shirasaki | |
| 5,999,320 A | 12/1999 | Shirasaki | |
| 6,370,300 B1* | 4/2002 | Eggleton et al. | ............... 385/37 |
| 2003/0185504 A1* | 10/2003 | Yamauchi et al. | ............ 385/27 |
| 2004/0027690 A1* | 2/2004 | Takahashi | .................. 359/726 |

FOREIGN PATENT DOCUMENTS

| | | |
|---|---|---|
| JP | 9-43057 | 2/1997 |
| JP | 2000-511655 | 9/2000 |

* cited by examiner

*Primary Examiner*—Dzung Tran
(74) *Attorney, Agent, or Firm*—Staas & Halsey LLP

(57) ABSTRACT

A chromatic dispersion generating apparatus of the present invention comprises a VIPA plate capable of emitting an incident light to different directions according to wavelengths, a three-dimensional mirror reflecting the light of respective wavelengths emitted from the VIPA plate at a previously set position to return them to the VIPA plate, and a control section that controls a position of the three-dimensional mirror and the temperature of the VIPA plate. The control section computes a target position of the three-dimensional mirror and the target temperature of the VIPA plate, which correspond to an arbitrary wavelength and a chromatic dispersion value, based on data relating to positions of the three-dimensional mirror corresponding to a plurality of chromatic dispersion values of a specific wavelength and a chromatic dispersion slope value, and data relating to the temperatures of the VIPA plate corresponding to a plurality of dispersion values for respective wavelengths on a predetermined wavelength grid and a wavelength temperature coefficient, which are stored in a storage circuit, to optimize the computed target position and the computed target temperature. As a result, it becomes possible to generate the chromatic dispersion with high accuracy at an arbitrary wavelength.

9 Claims, 12 Drawing Sheets

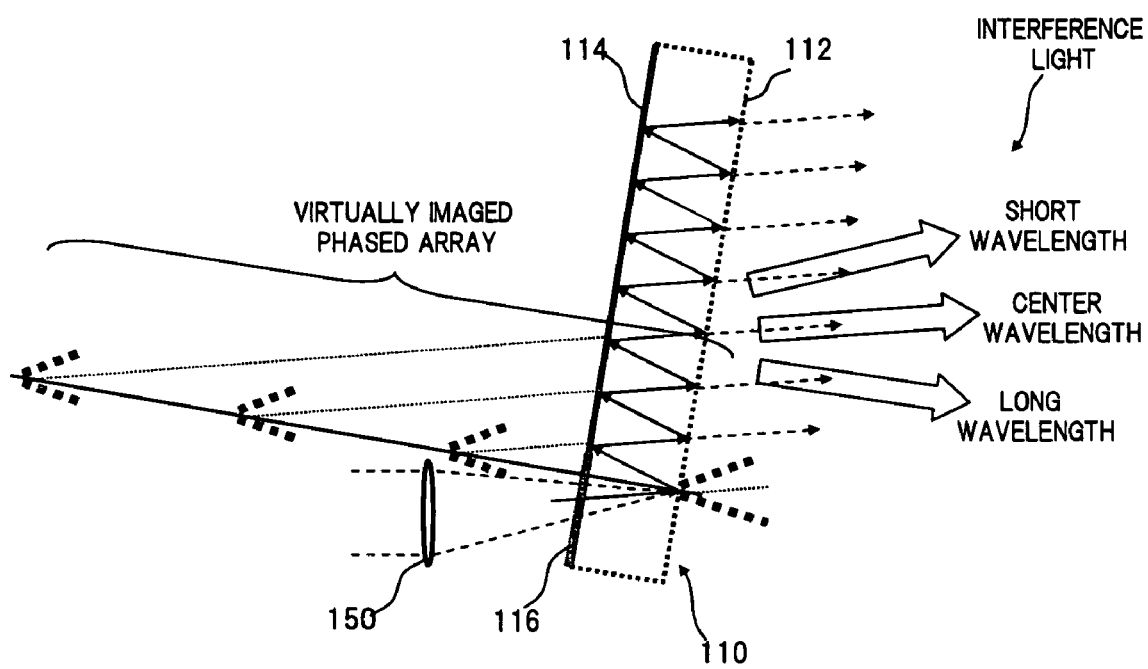

CHROMATIC DISPERSION GENERATING APPARATUS

BACKGROUND OF THE INVENTION

1. Field of the Invention

The present invention relates to a chromatic dispersion generating apparatus capable of generating the required chromatic dispersion to perform the chromatic dispersion compensation of optical signals, the chromatic dispersion tolerance measurement of an optical components or the like, and in particular, to a chromatic dispersion generating apparatus configured by utilizing an optical component provided with a function of demultiplexing an input light according to wavelengths.

2. Description of the Related Art

In an optical fiber communication system, the chromatic dispersion compensation is performed using, for example, a dispersion compensation fiber (DFC) having a characteristic opposite to a chromatic dispersion characteristic of a laid single mode fiber (SMF) or the like. Since a chromatic dispersion value of the DCF is adjusted according to the length thereof, there are many cases where the total fiber length necessary for compensating for the required chromatic dispersion is previously calculated, to prepare a plurality of DCF reels of different lengths. Therefore, at a system installation site, the chromatic dispersion value can be set based on only the combination of the prepared DCF reels. Accordingly, sometimes, it is hard to realize the optimum chromatic dispersion compensation.

To such a DCF, as one of chromatic dispersion compensators capable of freely setting the chromatic dispersion value, there has been proposed a chromatic dispersion compensator configured utilizing a so-called virtually imaged phased array (VIPA) for demultiplexing an input light into a plurality of optical beams that can be distinguished spatially according to wavelengths (refer to Japanese Unexamined Patent Publication No. 9-43057 and Japanese National Publication No. 2000-511655).

FIG. 13 is a perspective view showing a configuration example of a conventional VIPA-type chromatic dispersion compensator. Further, FIG. 14 is a top view of the configuration example of FIG. 13.

As shown in each figure, in the conventional VIPA-type chromatic dispersion compensator, a light emitted from one end of an optical fiber 130 via an optical circulator 120 is converted into a parallel light by a collimate lens 140 and, then, condensed on one segment by a line focusing lens 150 and passes through a radiation window 116 of a VIPA plate 110 to be incident between opposed parallel planes. The incident light on the VIPA plate 110 is multiple-reflected repeatedly, for example, between a reflective multilayer film 112 formed on one plane of the VIPA plate 110 and having the reflectance lower than 100% and a reflective multilayer film 114 formed on the other plane and having the reflectance of substantially 100%. At this time, every time the incident light is reflected on the surface of the reflective multilayer film 112, a few % of the light is transmitted through the surface to be emitted outside the VIPA plate 110.

The lights transmitted through the VIPA plate 110 interfere mutually and form a plurality of optical beams, traveling directions of which are different from each other, according to wavelengths. As a result, if each of the optical beams is condensed to one point by a convergent lens 160, each condensed position moves on a straight line according to variation of the wavelengths. By disposing, for example, a three-dimensional mirror 170 on the straight line, the lights that have been emitted from the VIPA plate 110 and condensed by the convergent lens 160 are reflected at different positions on the three-dimensional mirror 170 according to respective wavelengths to be returned to the VIPA plate 110. Since the lights reflected on the three-dimensional mirror 170 are propagated through an optical path through which the lights have been propagated previously, in an opposite direction, different wavelength components are propagated for different distances and, therefore, the chromatic dispersion of the input light is compensated.

In consideration of a model as shown in FIG. 15, for example, behavior of the light that is multiple-reflected by the VIPA plate 110 as described above is similar to that in an Echelon grating that is well-known as a step-wise diffraction grating. Therefore, the VIPA plate 110 can be considered as a virtual diffraction grating. Further, in consideration of an interference condition in the VIPA plate 110, as shown on the right side in FIG. 15, the emitted light interferes under a condition in which, with an optical axis thereof as a reference, a shorter wavelength is above the optical axis and a longer wavelength is below the optical axis. Therefore, among a plurality of optical signals of respective wavelengths, optical signals on the shorter wavelength side are output above the optical axis and optical signals on the longer wavelength side are output below the optical axis. Such a conventional VIPA-type chromatic dispersion compensator has advantages in that the chromatic dispersion can be compensated over a wide range and also the wavelength (transmitted wavelength) of a light to be compensated can be varied.

In the conventional VIPA-type chromatic dispersion compensators as described above, even if optical characteristics, such as the chromatic dispersion value, the transmitted wavelength and the like, are the same, internal setting values (for example, the position of the three-dimensional mirror, the temperature of the VIPA plate and the like) are different, due to individual differences of components of VIPA optical system. Therefore, the applicant of the present invention has proposed a technology for obtaining to store data relating to a chromatic dispersion value and a transmission wavelength characteristic in each wavelength corresponding to the position of the three-dimensional mirror, the temperature of the VIPA plate and the like, before starting an operation of the chromatic dispersion compensation, and then, at the operation time, reading the data corresponding to setting conditions such as the chromatic dispersion value and the like, out of the stored data, to control the position of the three-dimensional mirror and the temperature of the VIPA plate (refer to Japanese Unexamined Patent Publication No. 2003-311083).

However, in the above described prior invention, basically, the data relating to all of the wavelengths and the chromatic dispersion values which are assumed to be used at the operation time should be previously acquired. Therefore, in order to realize a general-purpose VIPA-type chromatic dispersion compensator capable of coping with more wavelengths and more chromatic dispersion values, there is a caused problem in that a long time is required for acquiring the data.

Further, the above described conventional VIPA-type chromatic dispersion compensator has been reviewed, as another usage thereof, to be utilized for the chromatic dispersion tolerance measurement of devices or modules used in the optical communication. In this usage, the configuration shown in FIG. 13 is utilized as a chromatic dispersion emulator operating at arbitrary wavelengths. In the above described usage for the chromatic dispersion compensation, since optical signals corresponding to a wavelength grid in conformity with the ITU-T or the like are basically objects of the chromatic dispersion compensation, the above data may be acquired corresponding to respective wavelengths on the grid, as the stored data. On the contrary, in the usage as the chromatic dispersion emulator, since devices and modules to be used on the wavelengths outside the wavelength grid in conformity with the ITU-T or the like are objects of the chromatic dispersion tolerance measurement, the above data corresponding to the arbitrary wavelength should be previously acquired to be stored. Therefore, in order to realize the desired measurement accuracy, there is a caused problem in that it takes a significantly long time required for acquiring the data, and also a memory of large capacity is necessary.

SUMMARY OF THE INVENTION

The present invention has been accomplished in view of the above problems and has an object to provide a chromatic dispersion generating apparatus capable of generating the chromatic dispersion at an arbitrary wavelength with high accuracy.

In order to achieve the above object, the present invention provides a chromatic dispersion generating apparatus which comprises: an optical component provided with a demultiplexing function, including a device having two reflective surfaces which are opposed and parallel to each other, in which a light condensed in the one-dimensional direction is incident between the reflective surfaces of the device, and a part of the incident light is transmitted through one of the reflective surfaces while the incident light being multiple-reflected on the respective reflective surfaces, to be emitted, and the emitted light interferes mutually, so that optical beams traveling directions of which are different from each other according to wavelengths are formed; and a reflector reflecting, at a previously set position, optical beams of respective wavelengths emitted from one of the reflective surfaces of the optical component in different directions to return the optical beams to the optical component, respectively. This chromatic dispersion generating apparatus further comprises: a storing section that includes a first area which stores, for a specific wavelength among a plurality of wavelengths on a predetermined wavelength grid, data relating to positions of the reflector corresponding to at least two chromatic dispersion values together with the specific wavelength and a chromatic dispersion slope value, and a second area which stores, for the respective wavelengths on the wavelength grid, data relating to the temperatures of the optical component corresponding to at least two chromatic dispersion values together with the respective wavelengths on the wavelength grid and a wavelength temperature coefficient; a computing section designated with a wavelength and a chromatic dispersion value at an operation time, that computes a target position of the reflector corresponding to the designated wavelength and the designated chromatic dispersion value, based on information stored in the first area of the storing section, and also computes the target temperature of the optical component corresponding to the designated wavelength and the designated chromatic dispersion value, based on information stored in the second area of the storing section; a position control section that coincides the position of the reflector with the target position computed in the computing section; and a temperature control section that coincides the temperature of the optical component with the target temperature computed in the computing section.

It is preferable that, when the designated wavelength exists between the respective wavelengths on the wavelength grid, the computing section converts the designated chromatic dispersion value into a chromatic dispersion value in the specific wavelength using the chromatic dispersion slope value stored in the first area of the storing section, and thereafter, refers to the data relating to the positions of the reflector stored in the first area of the storing section to obtain the target position of the reflector corresponding to the chromatic dispersion value after conversion.

Further, the configuration may be such that the computing section sets the wavelength nearest to the designated wavelength, from the respective wavelengths on the wavelength grid, as a near-grid wavelength, refers to the data relating to the temperatures of the optical component stored in the second area of the storing section for the near-grid wavelength, obtains the temperature of the optical component corresponding to the chromatic dispersion value after conversion, and converts the obtained temperature into the temperature corresponding to the designated wavelength using the wavelength temperature coefficient stored in the second area of the storing section, to obtain the target temperature of the optical component.

The chromatic dispersion generating apparatus as described above is suitable for the usage as a chromatic dispersion compensator generating the chromatic dispersion capable of compensating for the chromatic dispersion accumulated in input optical signals or for the usage as a chromatic dispersion emulator generating the chromatic dispersion capable of measuring the chromatic dispersion tolerance of an optical components to which the chromatic dispersion emulator is connected. According to the chromatic dispersion generating apparatus of the present invention as described above, the position of the reflector corresponding to at least two chromatic dispersion values for the specific wavelength and the chromatic dispersion slope value are stored in the first area of the storing section as the data for controlling the position of the reflector, and the temperature of the optical component corresponding to at least two chromatic dispersion values for the respective wavelengths on the predetermined wavelength grid and the wavelength temperature coefficient are stored in the second area of the storing section as the data for controlling the temperature of the optical component, so that the chromatic dispersion can be generated with accuracy for an arbitrary wavelength. In such a chromatic dispersion generating apparatus, it is possible to acquire the optical characteristic data prior to the operation in a relatively short time, and also it is possible to effectively prevent the capacity of the storing section from being enlarged.

The other objects, features and advantages of the present invention will be apparent from the following description of the embodiments with reference to the accompanying drawings.

BRIEF DESCRIPTION OF THE DRAWINGS

FIG. 15 is a diagram showing a model for explaining an operation theory of a conventional VIPA.

DETAILED DESCRIPTION OF THE INVENTION

Figure 1:
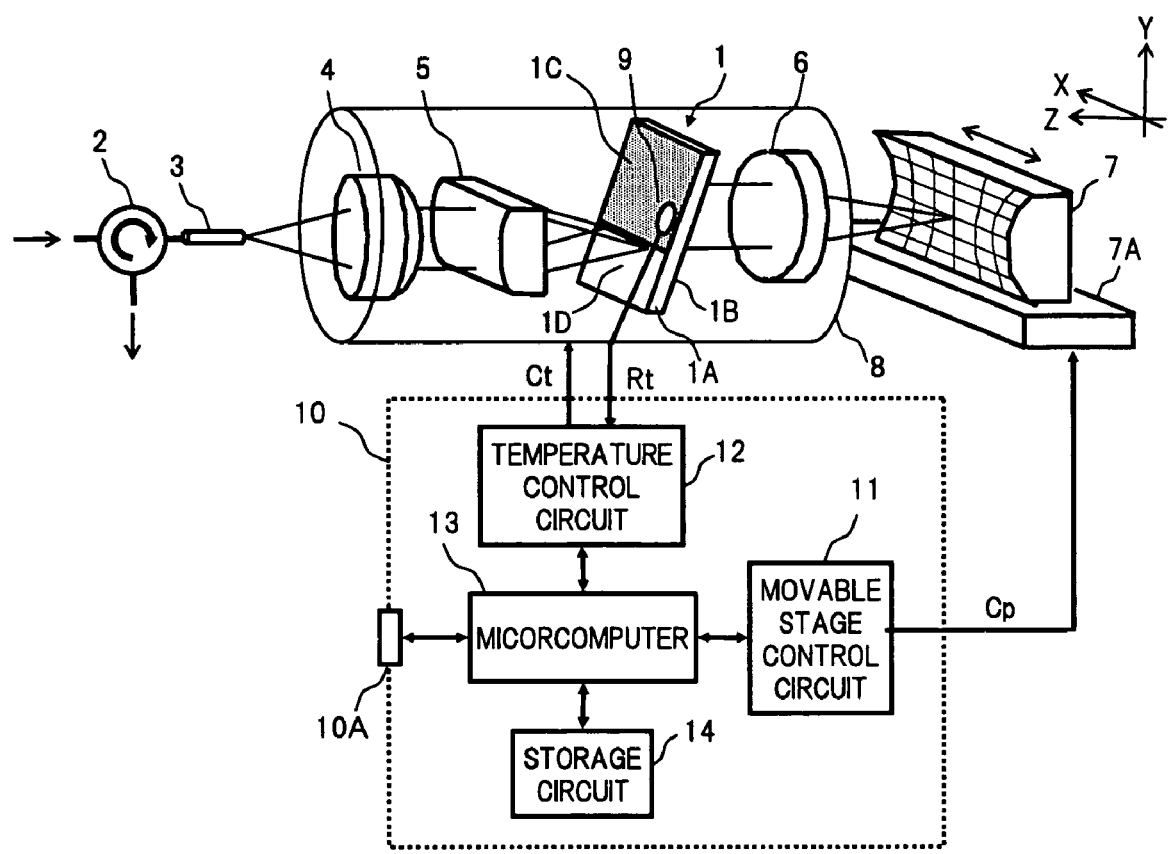
FIG. 1 is a block diagram showing a configuration of one embodiment of a chromatic dispersion generating apparatus according to the present invention.

Hereinafter, embodiments of the present invention will be described with reference to drawings. The same reference numerals denote the same or equivalent parts in all drawings.

FIG. 1 is a block diagram showing a configuration of one embodiment of a chromatic dispersion generating apparatus according to the present invention.

In FIG. 1, the chromatic dispersion generating apparatus in the present embodiment comprises, for example: a VIPA plate 1 as a device having two reflective surfaces which are opposed and parallel to each other; an optical system which consists of an optical circulator 2, an optical fiber 3, a collimate lens 4 and a line focusing lens 5, enabling optical signals condensed on a segment to be incident on a radiation window 1D of the VIPA plate 1; a convergent lens 6 condensing an optical beam that has been multiple-reflected by the VIPA plate 1 to be emitted from one of the parallel surfaces, on one point; a three-dimensional mirror 7 serving as a reflector, for reflecting the light condensed by the convergent lens 6 at a required position to return the light to the VIPA plate 1 via the convergent lens 6; a case 8 which accommodates therein required optical components inclusive of the VIPA plate 1; a temperature sensor 9 measuring the temperature of the VIPA plate 1; and a control section 10 that controls a position of the three-dimensional mirror 7 and the temperature of the VIPA plate 1.

Figure 13:
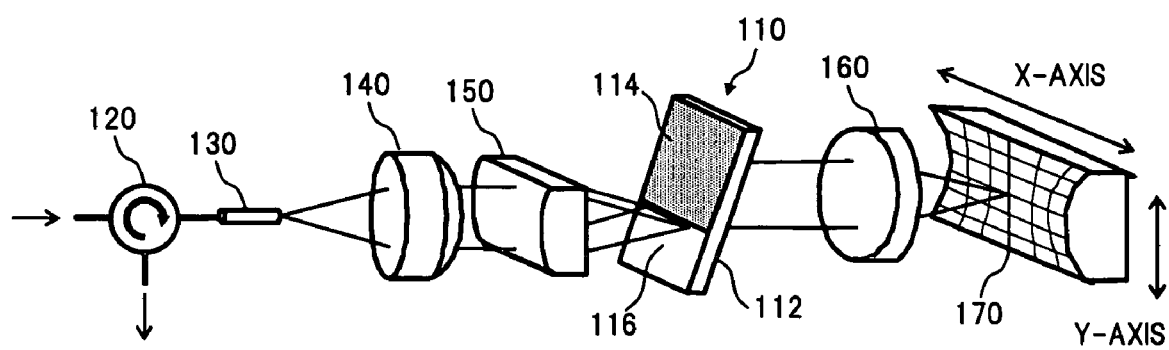
FIG. 13 is a perspective view showing a configuration example of a conventional VIPA-type chromatic dispersion compensator.
Figure 14:
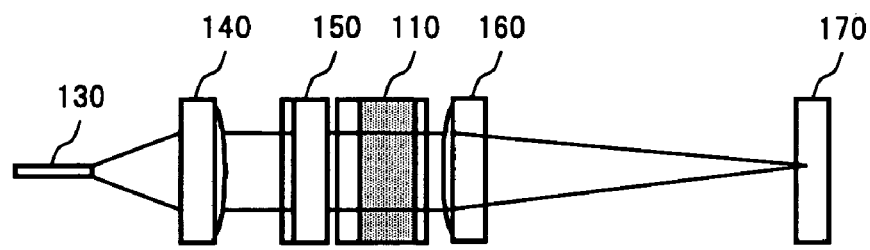
FIG. 14 is a top view of the configuration example in FIG. 13.

Similar to the VIPA 110 used in a conventional configuration shown in FIG. 13 to FIG. 15 described above, the VIPA plate 1 includes a glass plate 1A provided with parallel planes opposed to each other, a reflective multilayer film 1B formed on one of the parallel planes of the glass plate 1A, and a reflective multilayer film 1C and the radiation window 1D formed on the other of the parallel planes. Note, the VIPA plate 1 is tilted by a required angle from an angle at which an optical axis of the light incident on the radiation window 1D is incident vertically.

The glass plate 1A is manufactured using a substance having the linear thermal-expansion and a refractive index change depending on temperature. The reflective multilayer film 1B has the reflectance lower than 100% (preferably about 95-98%) with respect to the optical signals incident from the radiation window 1D and is formed on the entirety of one of the planes of the glass plate 1A. The reflective multilayer film 1C has the reflectance of substantially 100% with respect to the optical signals incident from the radiation window 1D and is formed on a part of the other plane of the glass plate 1A. Another part of the other plane of the glass plate 1A, on which the reflective multilayer film 1C is not formed, is the radiation window 1D transparent to the optical signals.

The optical circulator 2 is a typical optical component including three ports, for example, and transmitting a light in directions from a first port to a second port, from the second port to a third port and from the third port to the first port. Here, the optical signals input to the present chromatic dispersion generating apparatus are given to the first port of the optical circulator 2 and sent to one end of the optical fiber 3 via the second port, while the optical signals returned to the other end of the optical fiber 3 are output from the third port via the second port as an output light of the present chromatic dispersion generating apparatus.

The optical fiber 3 is, for example, a single-mode optical fiber and the like, one end thereof being connected with the second port of the optical circulator 2 and the other end being arranged in the vicinity of the collimate lens 4. Note, the type of the optical fiber 3 is not limited to that described above.

The collimate lens 4 is a typical lens converting an optical beam emitted from the other end of the optical fiber 3 into a parallel light to supply it to the line focusing lens 5.

The line focusing lens 5 condenses the parallel light from the collimate lens 4 on one segment and, more specifically, it may be a cylindrical lens, a refractive index profile lens or the like.

The convergent lens 6 is a typical lens condensing on one point, a plurality of optical beams that is multiple-reflected by the VIPA plate 1 to be emitted from the side of the reflective multilayer film 1B, and interferes mutually so that a traveling direction thereof is different for each wavelength.

The three-dimensional mirror 7 has, for example, a three-dimensional structure in which the surface thereof is aspheric, and there is a central axis acting as a design reference on the aspheric mirror. This three-dimensional mirror 7 is attached to a movable stage 7A and arranged so that a traveling axis of the movable stage 7A is parallel to respective directions of the central axis (in an X-axis direction in FIG. 1). The movable stage 7A travels in the X-axis direction, by driving a pulse motor or the like (not shown in the figure) in accordance with a control signal Cp output from the control section 10. Note, herein, an optical axis direction of the optical signals radiated to the VIPA plate 1 is in a Z-axis, and a vertical direction and a parallel direction to an angular dispersion direction of the light emitted from the VIPA plate 1 are in an X-axis and a Y-axis, respectively.

The case 8 is a cylindrical container or the like, provided with a film heater (not shown in the figure) on a side surface thereof, and here, the collimate lens 4, the line focusing lens 5, the VIPA plate 1 and the convergent lens 6 are accommodated at predetermined positions inside the container. An operation of the film heater is controlled in accordance with a control signal Ct from the control section 10.

The temperature sensor 9 is attached to, for example, an outer surface of the reflective multilayer film 1C of the VIPA plate 1. As the temperature sensor 9, a typical temperature sensor whose internal resistance value is changed according to the temperature of the VIPA plate 1 is used. A signal Rt indicating the resistance value of the temperature sensor 9 is output to the control section 10. Note, the attachment position of the temperature sensor 9 is not limited to the position described above, and it is possible to attach the temperature sensor 9 to an arbitrary position at which the temperature of the VIPA plate 1 can be measured.

The control section 10 comprises, for example: a movable stage control circuit 11 serving as a position control section that optimizes the position of the three-dimensional mirror 7; a temperature control circuit 12 serving as a temperature control section that optimizes the temperature of the VIPA plate 1; a microcomputer 13 controlling the movable stage control circuit 11 and the temperature control circuit 12; and a storage circuit 14 serving as a storing section that stores optical characteristic data of the present apparatus, which has been previously acquired in accordance with the routine as described later, in a nonvolatile memory or the like. The microcomputer 13 has a function serving as a computing section that reads out the optical characteristic data stored in the storage circuit 14 in accordance with a setting command input thereto via an external communication connector 10A, and computes a target value of the position of the three-dimensional mirror 7 and a target value of the temperature of the VIPA plate 1, to transfer the computation results to the movable stage control circuit 11 and the temperature control circuit 12.

Here, there will be described a specific configuration of the control section 10 by classifying into respective functions of the movable stage control, the temperature control, and the communication and command processing.

Figure 2:
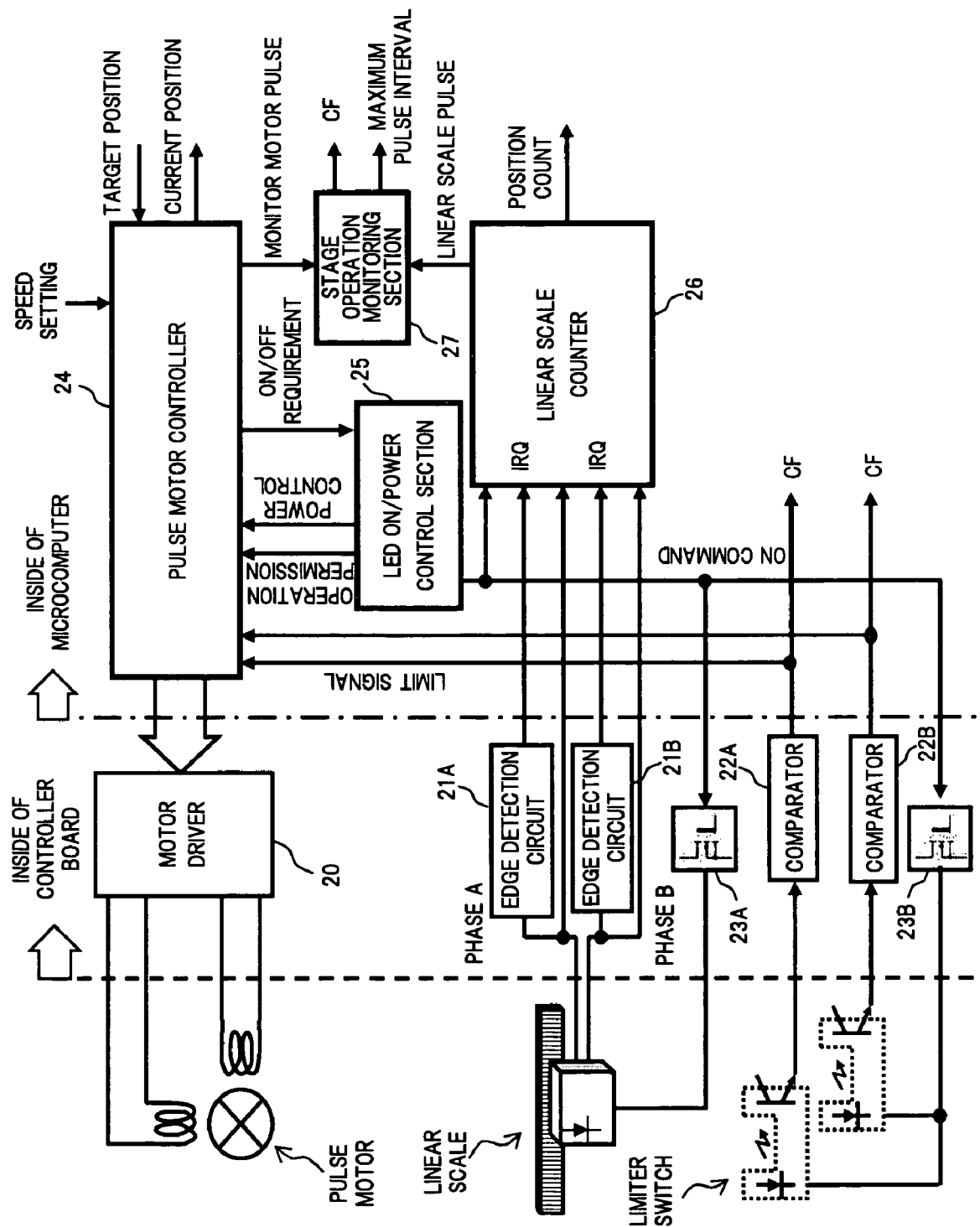
FIG. 2 is a functional block diagram showing a configuration example relating to a movable stage control by a control section in the above embodiment.

FIG. 2 is a functional block diagram showing a configuration example relating to the movable stage control by the control section 10. Note, the functional blocks shown by the thin solid lines in the figure are configured by hardware (inclusive of the inside of the microcomputer), and the functional blocks shown by the bold solid lines are configured by software. Such an expression of the functional blocks is applied to the subsequent drawings.

In the configuration example of FIG. 2, as hardware configurations inside a board (to be referred to as a controller board) to which the control section 10 is mounted, there are disposed a motor driver 20, edge detection circuits 21A and 21B, comparators 22A and 22B, and MOSFET switches 23A and 23B. Further, as functional blocks configured by the software inside the microcomputer 13, there are disposed a pulse motor controller 24, a LED on/power control section 25, a linear scale counter 26 and a stage operation monitoring section 27.

The motor driver 20 gives a drive signal in accordance with an output command from the pulse motor controller 24, to a pulse motor for making the movable stage 7A to travel in the X-axis direction.

The edge detection circuits 21A and 21B each detects edges of an A-phase and a B-phase of a signal output from a linear scale disposed on the movable stage 7A for detecting the position of the three-dimensional mirror 7 in the X-axis direction, to output signals indicating the detection result to the linear scale counter 26.

The comparators 22A and 22B are given with output signals from limiter switches (LED and light receiving element) arranged on both ends of a movable range of the movable stage 7A in the X-axis direction, and in the case where the position of the movable stage 7A becomes outside the movable range, output limit signals indicating that the position of the movable stage 7A becomes outside the movable range to the pulse motor controller 24, and also generate condition-flags CF.

The MOSFET switch 23A controls the on/off of the linear scale of the movable stage 7A in accordance with an on-command from the LED on/power control section 25, and the MOSFET switch 23B controls the on/off of the respective LEDs of the limit switches in accordance with the on-command from the LED on/power control section 25.

The pulse motor controller 24 is input with the setting relating to a target position of the three-dimensional mirror 7 and a speed of the movable stage 7A, which are calculated based on the optical characteristic data in the storage circuit 14, and outputs a command for controlling a drive condition of the pulse motor in accordance with the input information, to the motor driver 20. An output condition of the command to the motor driver 20 is controlled according to the limit signals from the comparators 22A and 22B, and an operation permission signal and a power control signal from the LED on/power control section 25. Further, the pulse motor controller 24 outputs an on/off requirement to the LED on/power control section 25, and also outputs a monitor motor pulse signal corresponding to the drive condition of the pulse motor, to the stage operation monitoring section 27. Moreover, herein, a signal indicating a current position of the three-dimensional mirror 7 is also output from the pulse motor controller 24.

The LED on/power control section 25 generates the on-command in accordance with the on/off requirement from the pulse motor controller 24, to give it to the MOSFET switches 23A and 23B, and the linear scale counter 26. Further, the LED on/power control section 25 outputs the operation permission signal and the power control signal to the pulse motor controller 24.

The linear scale counter 26 obtains a position count based on the signal output from the linear scale of the movable stage 7A and the output signals from the edge detection circuits 21A and 21B, and also, outputs a linear scale pulse signal to the stage operation monitoring section 27.

The stage operation monitoring section 27 executes the calculation of a maximum pulse interval according to the monitor motor pulse signal from the pulse motor controller 24 and the linear scale pulse signal from the linear scale counter 26.

Figure 3:
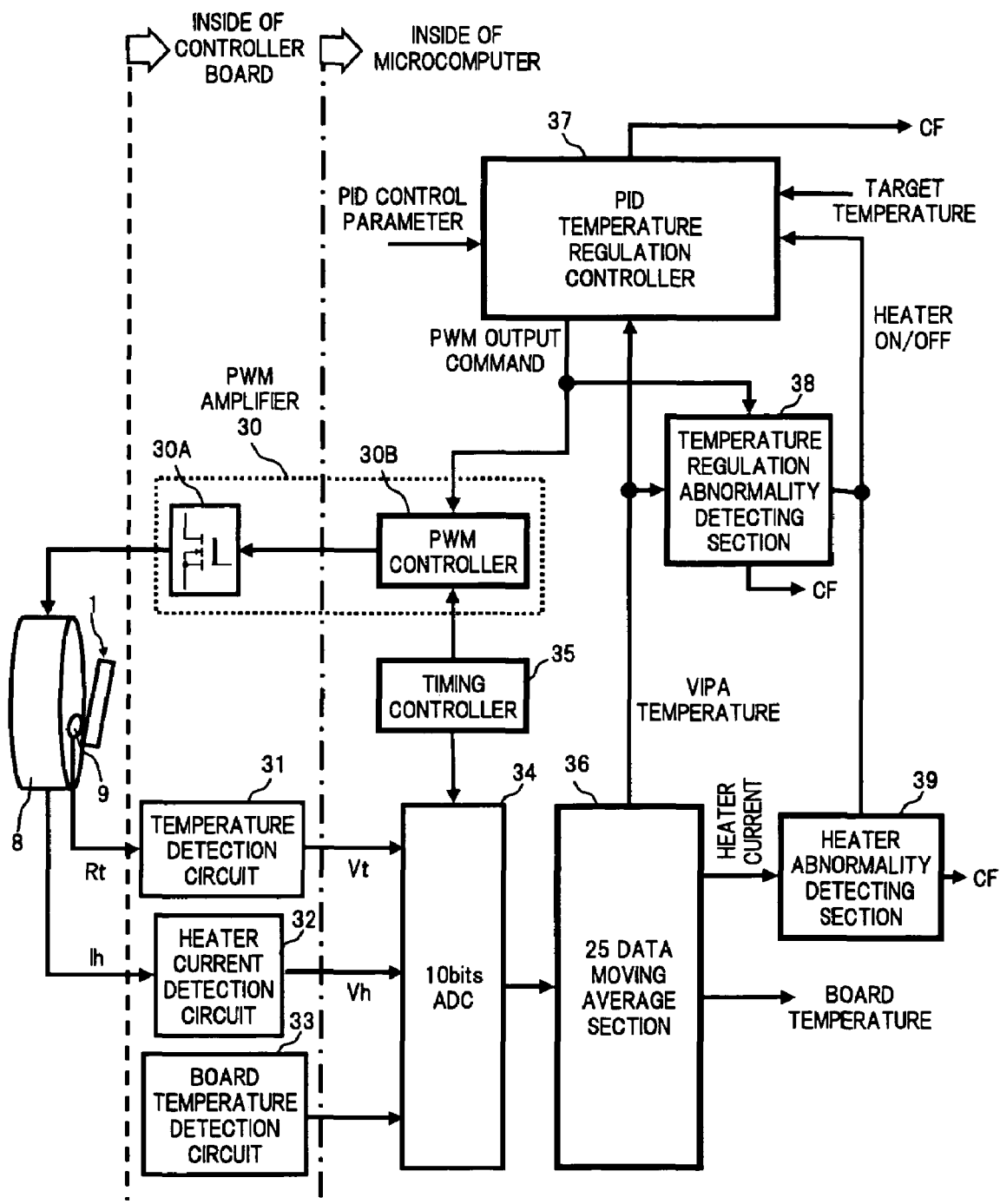
FIG. 3 is a functional block diagram showing a configuration example relating to a temperature control by the control section in the above embodiment.

FIG. 3 is a functional block diagram showing a configuration example relating to the temperature control by the control section 10.

In the configuration example of FIG. 3, as hardware configurations inside the controller board, there are disposed a pulse width modulation (PWM) amplifier 30, a temperature detection circuit 31, a heater current detection circuit 32 and a board temperature detection circuit 33. Further, inside the microcomputer 13, a 10 bits analog-digital converter (ADC) 34 is disposed as a hardware configuration, and also as functional blocks configured by the software, there are disposed a timing controller 35, a 25 data moving average section 36, a PID temperature regulation controller 37, a temperature regulation abnormality detecting section 38 and a heater abnormality detecting section 39.

The PWM amplifier 30 comprises, for example, a MOSFET switch 30A and a PWM controller 30B, and supplies a current signal the pulse width of which is modulated, to a heater disposed in the case 8 for regulating the temperature of the VIPA plate 1, to thereby drive the heater. Note, the PWM controller 30B is a functional block configured by the software, and controls a switching operation of the MOSFET switch 30A in accordance with a PWM output command output from the PID temperature regulation controller 37.

The temperature detection circuit 31 converts the signal Rt indicating the resistance value of the temperature sensor 9 disposed in the vicinity of the VIPA plate 1, into a voltage signal Vt, to output it to the 10 bits ADC 34. The heater current detection circuit 32 detects a drive current Ih for the heater, and converts it into a voltage signal Vh to output it to the 10 bits ADC 34. The board temperature detection circuit 33 detects the temperature of the controller board, to output the detection result to the 10 bits ADC 34.

The 10 bits ADC 34 converts the analog voltage signals respectively output from the temperature detection circuit 31, the heater current detection circuit 32 and the board temperature detection circuit 33, into digital signals, to output them to the data moving average section 37. The timing controller 35 optimizes operation timing of the PWM controller 30B and operation timing of the 10 bits ADC 34, to stabilize the temperature control of the VIPA plate 1 at high accuracy. The 25 data moving average section 36 averages each data which is AD converted in the 10 bits ADC 34, to calculate the temperature of the VIPA plate 1, and monitor values of the heater current and the board temperature. A signal indicating the temperature of the VIPA plate 1 calculated in the 25 data moving average section 36, is sent to the PID temperature regulation controller 37 and the temperature regulation abnormality detecting section 38, and a signal indicating the heater current is sent to the heater abnormality detecting section 39.

The PID temperature regulation controller 37 is input with the target temperature of the VIPA plate 1 calculated based on the optical characteristic data in the storage circuit 14 and also the setting relating to a parameter for performing a known proportional-plus-integral-plus-derivative control (PID control), and outputs, to the PWM controller 30B and the temperature regulation abnormality detecting section 38, a command (PWM output command) for controlling the drive condition of the heater, in accordance with the input information and a monitor value of the temperature of the VIPA plate 1 from the 25 data moving average section 36.

The temperature regulation abnormality detecting section 38 detects, based on the temperature of the VIPA plate 1 from the 25 data moving average section 36 and the PWM output command from the PID temperature regulation controller 37, whether or not an abnormality occurs in the temperature control by the PID temperature regulation controller 37, and outputs a heater ON/OFF signal corresponding to the detection result to the PID temperature regulation controller 37. Further, the heater abnormality detecting section 39 detects, based on the monitoring result of the heater current from the 25 data moving average section 36, whether or not an abnormality (for example, disconnection, short circuit or the like) occurs in the heater, and outputs a heater ON/OFF signal corresponding to the detection result to the PID temperature regulation controller 37. The PID temperature regulation controller 37, which received the heater ON/OFF signals from the temperature abnormality detecting section 38 and the heater abnormality detecting section 39, outputs a command for stopping the operation of the heater to the PWM controller 30B in the case where an occurrence of abnormality is detected in either the temperature abnormality detecting section 38 or the heater abnormality detecting section 39. At this time, a condition flag CF corresponding to the occurrence of abnormality is generated in each of the PID temperature regulation controller 37, the temperature regulation abnormality detecting section 38 and the heater abnormality detecting section 39.

Figure 4:
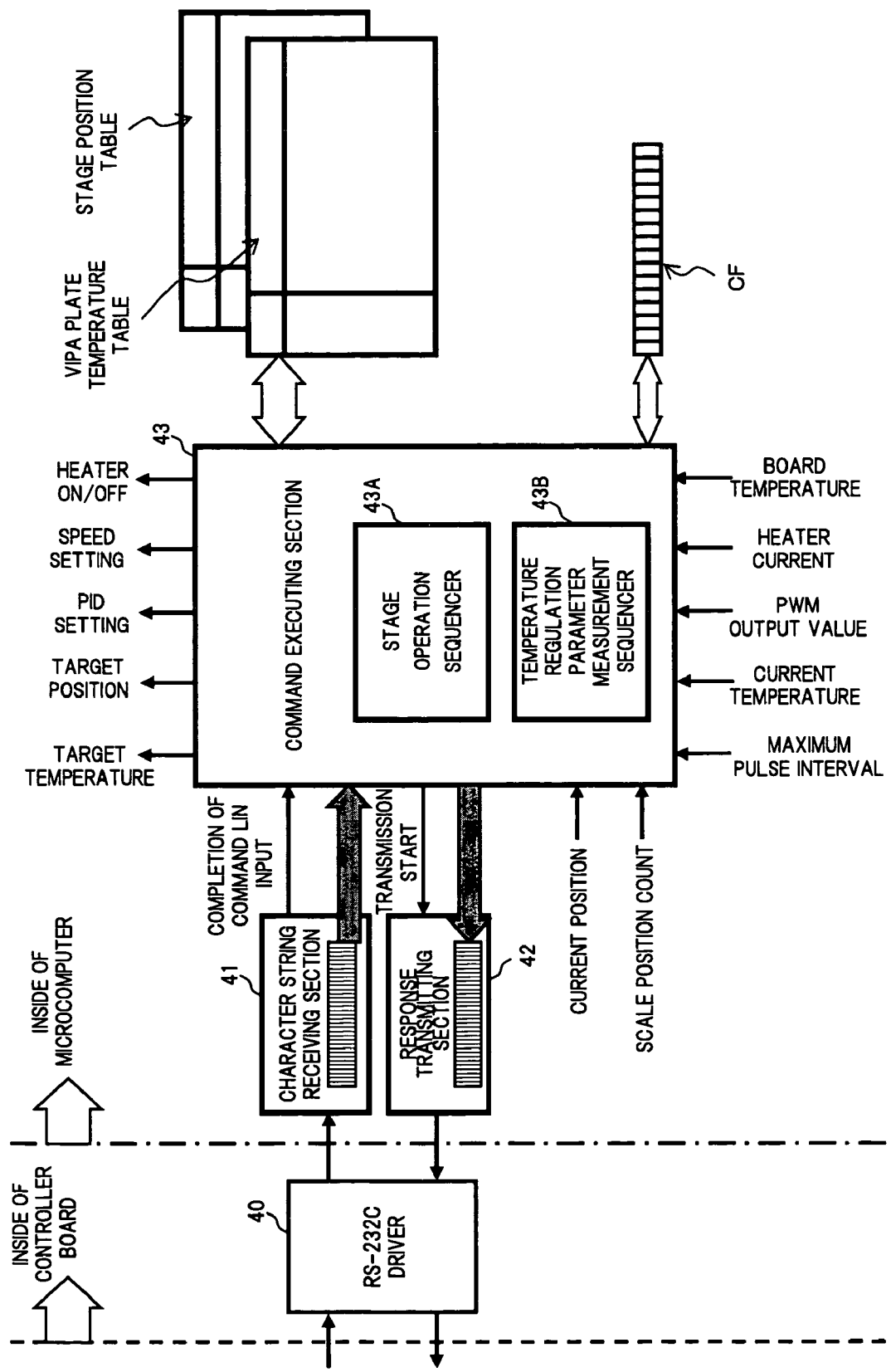
FIG. 4 is a functional block diagram showing a configuration example relating to the communication and command processing by the control section in the above embodiment.

FIG. 4 is a functional block diagram showing a configuration example relating to the communication and command processing by the control section 10.

In the configuration example of FIG. 4, as a hardware configuration inside the controller board, there is disposed a RS-232C driver 40. Further, as functional blocks configured by the software inside the microcomputer 13, a character string receiving section 41, a response transmitting section 42 and a command executing section 43.

The RS-232C driver 40 is a typical interface used for a serial communication between the microcomputer 13 and a supervising controller (not shown in figure). A data signal received by the microcomputer 13 via the RS-232C driver 40 is subjected to the necessary conversion processing in the character string receiving section 41, and thereafter, is sent to the command executing section 43. The command executing section 43 includes a stage operation sequencer 43A and a temperature regulation parameter measurement sequencer 43B, and executes various commands necessary for controlling the position of the three-dimensional mirror 7 and the temperature of the VIPA plate 1, based on the output signals and the condition flags from the respective functional blocks shown in FIG. 2 and FIG. 3, and the stored data in the storage circuit 14. Each of the various commands output from the command executing section 43 is subjected to the necessary conversion processing in the response transmitting section 42, and thereafter, is sent to supervising controller via the RS-232C driver 40.

Next, there will be described an operation of the present embodiment.

In the chromatic dispersion generating apparatus of the above configuration, before an operation of the chromatic dispersion compensation, the chromatic dispersion tolerance measurement or the like, is started, the optical characteristic data necessary for optimizing the position of the three-dimensional mirror 7 and the temperature of the VIPA plate 1 by the control section 10 is acquired by means of the measurement, and the acquired optical characteristic data is sent to the storage circuit 14 of the control section 10.

Table 1 and Table 2 each shows a specific example of the optical characteristic data stored in the storage circuit 14. Table 1 shows data indicating a relationship between a chromatic dispersion value for a previously set specific wavelength and the position of the movable stage, and table 2 shows data indicating a relationship of the temperature of the VIPA plate 1 to combinations of each wavelength on the ITU-T grid and each chromatic dispersion value.

TABLE 1

| wavelength dispersion value for specific wavelength [ps/nm] | −2000 | −1900 | −1800 | ... | 0 | ... | 1900 | 2000 |

TABLE 1-continued

| position of movable stage [mm] | AAA | BBB | CCC | ... | DDD | ... | EEE | FFF |
|---|---|---|---|---|---|---|---|---| specific wavelength: XXX [nm]
wavelength dispersion slope value: YYY [ps/nm²]

TABLE 2

| | | wavelength dispersion value [ps/nm] | | | | | | |
|---|---|---|---|---|---|---|---|---|
| | | −2000 | −1900 | −1800 | ... | 0 | ... | 1900 | 2000 |
| wavelength [nm] | 1525.661 | 79.413 | 79.413 | 80.488 | ... | 82.101 | ... | 77.800 | 77.532 |
| | 1526.438 | 78.958 | 79.229 | 79.766 | ... | 81.948 | ... | 77.345 | 77.613 |
| | 1527.216 | 79.073 | 79.343 | 79.912 | ... | 81.797 | ... | 77.429 | 77.429 |
| | . | . | . | . | ... | . | ... | . | . |
| | 1544.526 | 78.340 | 78.065 | 79.166 | ... | 80.818 | ... | 76.964 | 76.964 |
| | 1545.322 | 78.119 | 78.395 | 78.945 | ... | 81.153 | ... | 77.016 | 76.740 |
| | 1546.119 | 78.205 | 78.205 | 79.034 | ... | 81.242 | ... | 76.823 | 76.548 |
| | . | . | . | . | ... | . | ... | . | . |
| | 1563.863 | 77.465 | 77.717 | 78.312 | ... | 80.571 | ... | 76.055 | 76.055 |

Here, a specific example of a method of acquiring the data shown in table 1 will be described in detail referring to a flowchart in FIG. 5.

Figure 5:
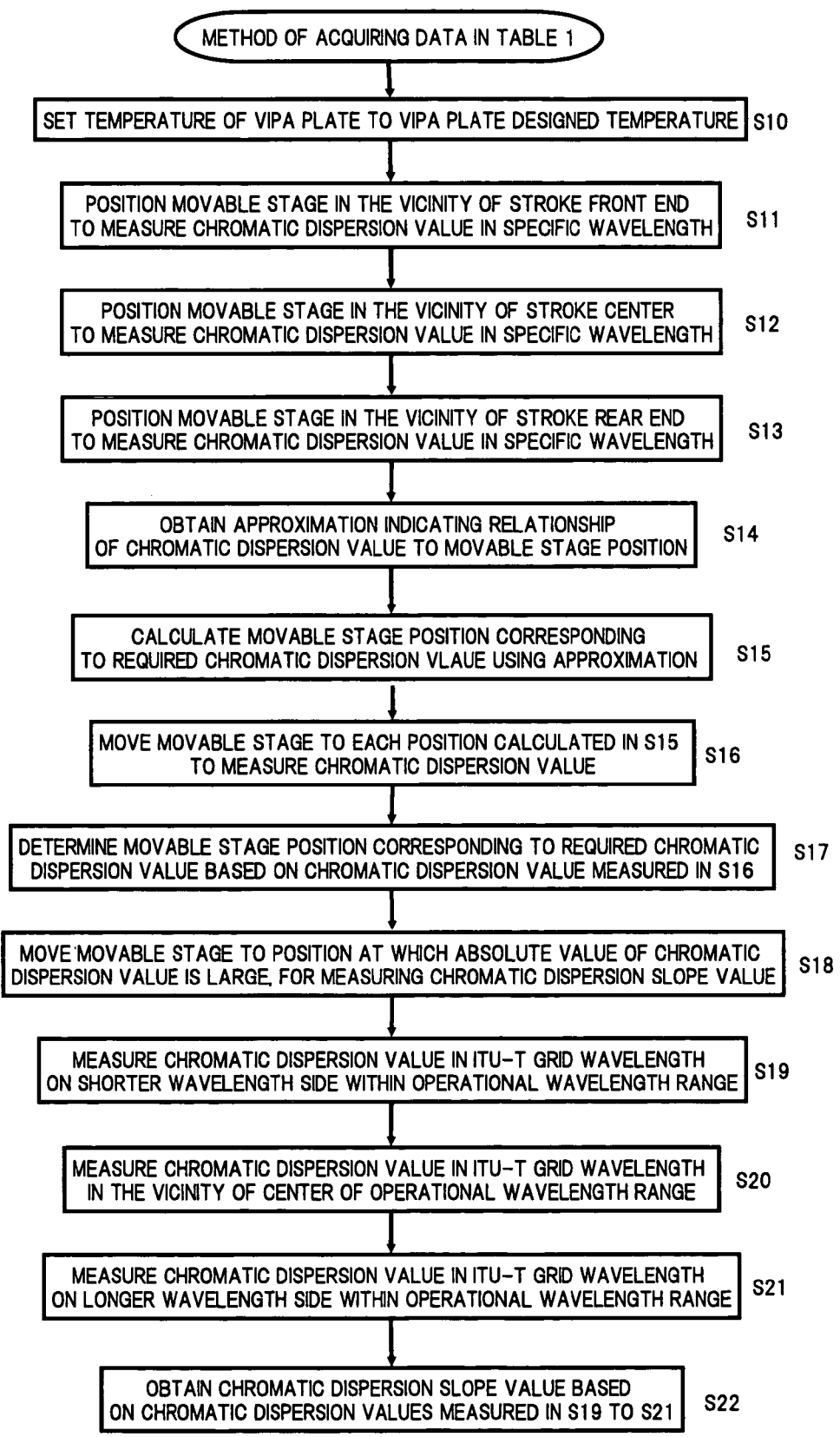
FIG. 5 is a flowchart showing a specific example of a method of acquiring data in Table 1 stored in a storage circuit in the above embodiment.

In order to acquire the relationship between the chromatic dispersion value and the position of the movable stage, at first, in step 10 (to be indicated as S10 in the figure, and the same rule shall be applied to the subsequent steps) of FIG. 5, the temperature of the VIPA plate 1 is set to the temperature (to be referred to as the VIPA plate designed temperature hereafter) at which each of the respective wavelengths on the ITU-T grid is approximately coincident with a transmission center wavelength of the VIPA plate 1.

In step 11, after the movable stage 7A is positioned in the vicinity of a front end of the movable range (stroke) in the X-axis direction, for an operational wavelength range (for example, C-band or the like) of the present chromatic dispersion generating apparatus, a ITU-T grid wavelength (for example, 1545.322 nm (194 THz if represented by a frequency)) existing in the vicinity of a center wavelength of the operational wavelength range is set to a specific wavelength, and the chromatic dispersion value in a transmission band in the vicinity of the specific wavelength is measured. Note, the above operational wavelength range is set so as to correspond to a wavelength band of optical signals being objects of the chromatic dispersion compensation or an active wavelength range of an optical communication apparatus being an object of the chromatic dispersion tolerance measurement.

In step 12, the movable stage 7A is positioned in the vicinity of the center of the movable range in the X-axis direction, and the chromatic dispersion value in the transmission band in the vicinity of the specific wavelength is measured.

In step 13, the movable stage 7A is positioned in the vicinity of a rear end of the movable range in the X-axis direction, and the chromatic dispersion value in the transmission band in the vicinity of the specific wavelength is measured.

In step 14, the respective chromatic dispersion values measured in steps 11 to 13 are plotted so as to correspond to the positions of the movable stage 7A, and the approximation representing the relationship between the chromatic dispersion value and the position of the movable stage 7A is obtained by applying the typical approximation, such as the collinear approximation, the quadratic approximation or the like.

In step 15, based on the approximation obtained in step 14, the positions of the movable stage corresponding to required chromatic dispersion values (in the example of table 1; −2000, −1900, −1800, ... , 1900, 2000 ps/nm) are calculated. Note, herein, there has been exemplarily shown the case where the chromatic dispersion values are set by each 100 ps/nm in a range of ±2000 ps/nm. However, the setting of the chromatic dispersion values is not limited to the above example, and at least two chromatic dispersion values may be set. Further, the position of the movable stage corresponding to each of the chromatic dispersion values is represented by a unit of [mm]. However, the position of the movable stage may be represented by the number of pulses driving a motor.

In step 16, the movable stage 7A is moved to each of the positions calculated in step 15, and the chromatic dispersion value at each of the positions is measured. Note, this measurement is performed on the wavelength band same as that in steps 11 to 13.

In step 17, in the case where the chromatic dispersion values measured in step 16 are not coincident with the chromatic dispersion values calculated in step 15, the positions of the movable stage 7A at which the required chromatic dispersion values (chromatic dispersion values set by each 100 ps/nm in table 1) can be achieved, are obtained by the calculation, based on the positions of the movable stage 7A corresponding to the measured chromatic dispersion values. At this time, the formula used for the calculation may be the approximation obtained in step 14 or the approximation obtained by newly plotting the positions of the movable stage 7A and the chromatic dispersion values based on the data measured in step 16 to apply the typical approximating method, such as the collinear approximation, the quadratic approximation or the like.

In step 18, since the data of table 1 could be acquired by performing the processing up to step 17, next, a chromatic dispersion slope value is measured. At first, the movable stage 7A is moved to the position at which an absolute value of the chromatic dispersion value is large.

In step 19, the chromatic dispersion value in the transmission band in the vicinity of the ITU-T grid wavelength (for example, 1525.611 nm (196.5 THz if represented by the frequency)) on the shorter wavelength side of the operational wavelength range (for example, C-band or the like) of the present chromatic dispersion generating apparatus, is measured.

In step 20, the position of the movable stage 7A is fixed, and the chromatic dispersion value in the transmission band in the vicinity of the ITU-T grid wavelength (for example, 1545.322 nm (194 THz if represented by the frequency)) near the center of the operation wavelength range, is measured.

In step 21, the position of the movable stage 7A is fixed, and the chromatic dispersion value in the transmission band in the vicinity of the ITU-T grid wavelength (for example, 1564.679 nm (191.6 THz if represented by the frequency)) on the longer wavelength side of the operation wavelength range, is measured.

In step 22, the data measured in steps 19 to 21 is plotted with the wavelength as the horizontal axis and the chromatic dispersion value as the vertical axis, and an inclination of the approximation line is calculated. This line inclination becomes "chromatic dispersion slope value". Therefore, a value with a unit of "ps/nm$^2$" is stored in the storage circuit 14, together with the data in table 1 and the data of the specific wavelength.

Figure 6:
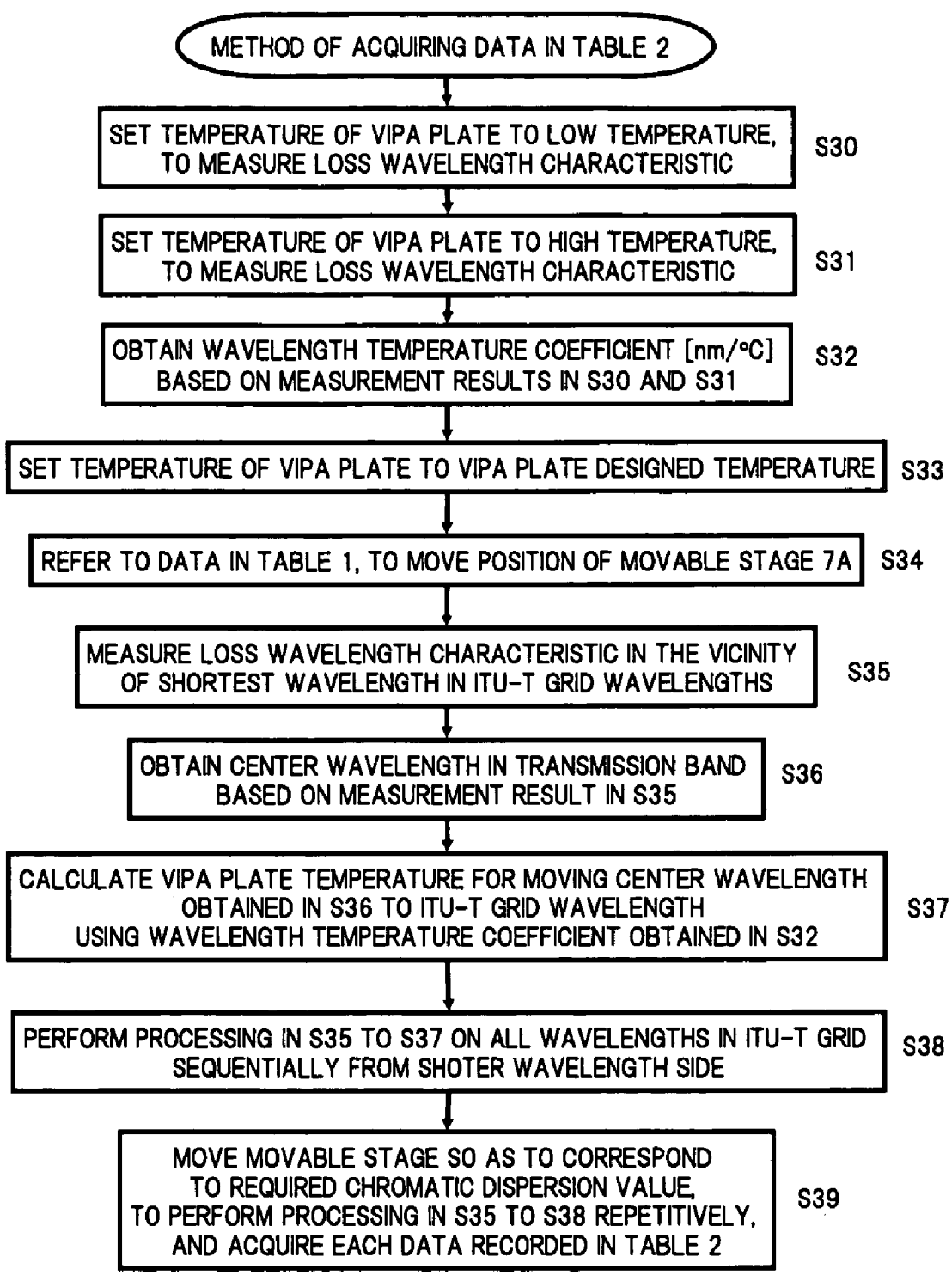
FIG. 6 is a flowchart showing a specific example of a method of acquiring data in Table 2 stored in the storage circuit in the above embodiment.

Next, a specific example of a method of acquiring the data shown in table 2 will be described in detail referring to a flowchart in FIG. 6.

In step 30, the temperature of the VIPA plate 1 is set to the low temperature, and a loss wavelength characteristic (the horizontal axis: wavelength, the vertical axis: loss [dB]) in the vicinity of an arbitrary wavelength on the ITU-T grid, is measured.

In step 31, the temperature of the VIPA plate 1 is set to the high temperature, the loss wavelength characteristic in the wavelength band at which the measurement in step 30 has been performed, is measured.

In step 32, a wavelength temperature coefficient [nm/C°] is calculated based on the measurement results in steps 30 and 31. This wavelength temperature coefficient indicates a changing ratio of a center wavelength of a transmission band of the VIPA plate 1 to a temperature change of the VIPA plate 1.

In step 33, the temperature of the VIPA plate 1 is set to the VIPA plate designed temperature (the temperature at which the ITU-T grid wavelength is a transmission center).

In step 34, the movable stage 7A is moved to the position of a settable minimum chromatic dispersion value, referring to the data in table 1.

In step 35, the loss wavelength characteristic (the horizontal axis: wavelength, the vertical axis: loss [dB]) in the vicinity of the shortest wavelength of the ITU=T grid wavelengths is measured.

Figure 7:
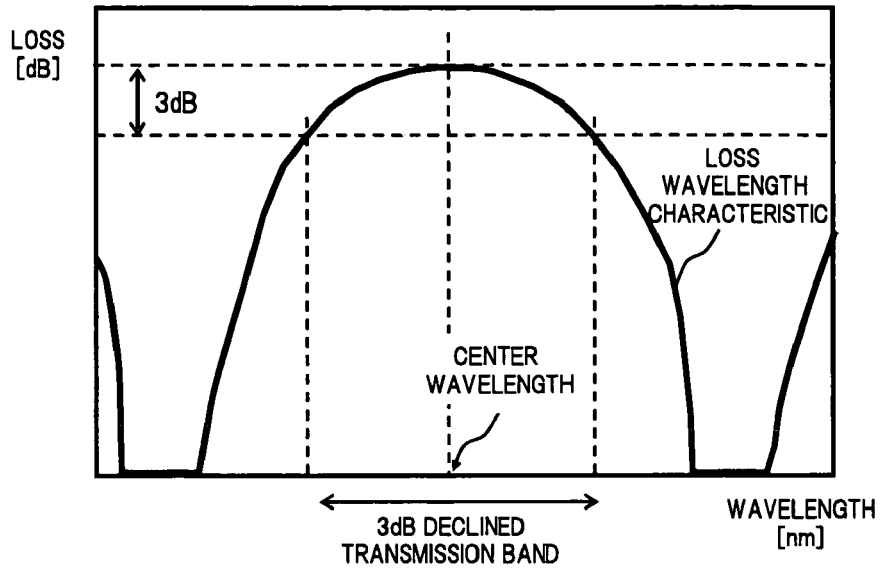
FIG. 7 is a graph showing one example for obtaining a transmission center wavelength declined by 3 dB.

In step 36, the wavelengths at intersection points (two points) of a level line declined by 1 dB or 3 dB (depending on the specification definition of the present chromatic dispersion generating apparatus) from the minimum loss level in the loss wavelength characteristic measured in step 35, with a loss characteristic curve, are specified, and an intermediate wavelength of the specified wavelengths (the center wavelength of the transmission band) is obtained. FIG. 7 is one example in which the transmission center wavelength declined by 3 dB is obtained.

In step 37, the VIPA plate setting temperature for shifting the center wavelength of the transmission band obtained in step 36 to the ITU-T grid wavelength existing in the vicinity of the center wavelength, is calculated using the wavelength-temperature coefficient obtained in step 32, and the calculated setting temperature is recorded as the data of table 2 so as to correspond to the ITU-T grid wavelength.

In step 38, the processing similar to that in steps 35 to 37 is performed on all the wavelengths on the ITU-T grid in the operational wavelength range (for example, C-band) sequentially from the shorter wavelength side.

In step 39, the position of the movable stage 7A at which the chromatic dispersion value is increased by a required value (in the example in table 2, each 100 ps/nm) than that at the current position of the movable stage 7A, is obtained based on the data in table 1, and after the movable stage 7A is moved to this position, the processing in steps 35 to 38 is executed. Then, a series of the above operations is repetitively performed until the movable stage 7A is moved to the position corresponding to a maximum chromatic dispersion value, and thus, the respective data in table 2 is acquired.

Note, in the example of the method of acquiring the data in table 2 as described above, the wavelength temperature coefficient is calculated in step 32. According to this calculation, the wavelength temperature coefficient is a fixed value. However, strictly speaking, the wavelength temperature coefficient depends on the temperature.

In the measurement for acquiring the data in table 2, since the temperature of the VIPA plate 1 is set to the VIPA plate designed temperature, the center wavelength of the transmission band can be matched with the wavelength on the ITU-T grid by slightly varying the temperature, and the wavelength temperature coefficient can be regarded as the fixed value if the temperature variation is slight. Therefore, it is possible to acquire the data in table 1 by the routine as described above. However, in the usage of the present invention as a chromatic dispersion emulator or the like, which is required to enable the chromatic dispersion tolerance measurement of a certain wavelength between the respective wavelengths on the ITU-T grid, in order to change significantly the temperature of the VIPA plate 1 to enable the use of the present invention in an arbitrary wavelength, it is preferable that the temperature dependence of the wavelength temperature coefficient is defined as a function, in accordance with the routine as shown in a flowchart of FIG. 8 for example.

Figure 8:
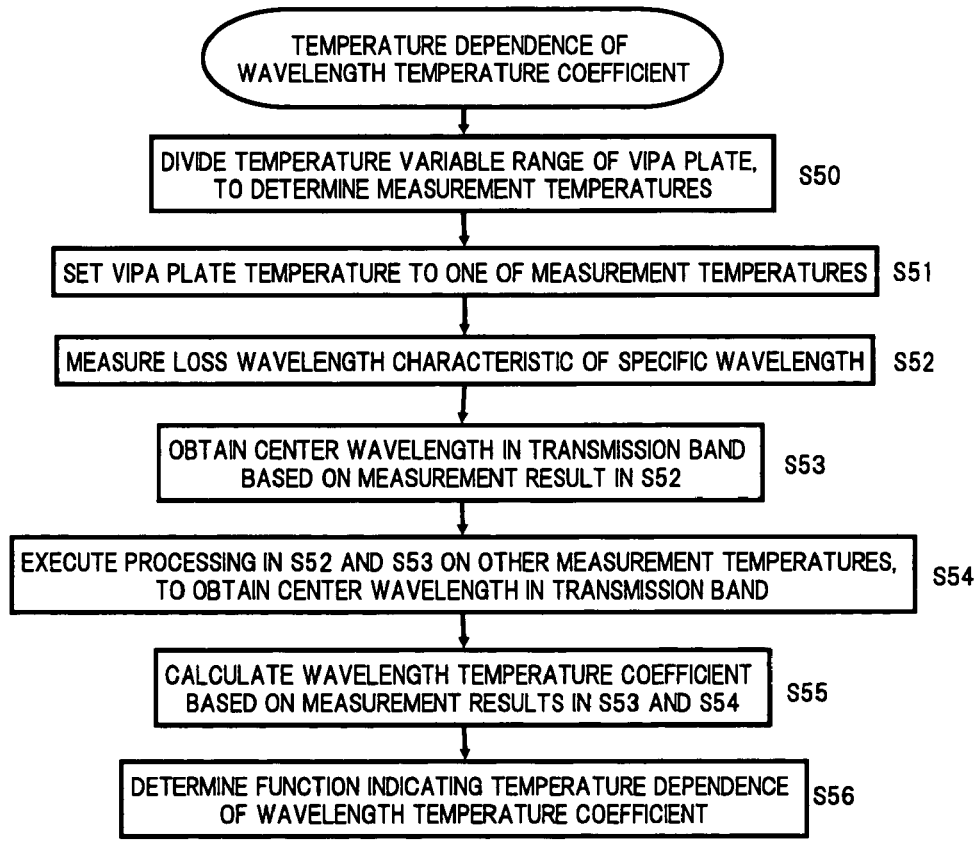
FIG. 8 is a flowchart showing the routine for leading the approximation representing the temperature dependence of a wavelength temperature coefficient.

In FIG. 8, in step 50, a temperature variable range of the VIPA plate 1 is divided into four for example, and the measurement temperatures of from the lowest setting temperature to the highest setting temperature are determined. Here, if the temperature variable range is 35° C. to 95° C. for example, the measurement temperatures are 35° C., 50° C., 65° C., 80° C. and 95° C. However, the setting of the measurement temperature is not limited to this example.

In step 51, the temperature of the VIPA plate 1 is set to the first temperature (for example, 35° C.).

In step 52, the loss wavelength characteristic (the horizontal axis: wavelength, the vertical axis: loss [dB]) in the transmission band in the vicinity of the above specific wavelength (the ITU-T grid wavelength in the vicinity of the center of the operational wavelength range) is measured.

In step 53, the wavelengths at intersection points (two points) of the level line declined by 1 dB or 3 dB (depending on the specification definition of the present chromatic dispersion generating apparatus) from the minimum loss level in the loss wavelength characteristic measured in step 52, with the loss characteristic curve, is specified, and an intermediate wavelength of the specified wavelengths (the center wavelength of the transmission band) is obtained (refer to FIG. 7).

In step 54, the temperature of the VIPA plate 1 is set to the next measurement temperature (for example, 50° C.), and the processing similar to that in steps 52 and 53 is executed, so that the center wavelength of the transmission band is obtained. Then, the above processing is repetitively performed for the other measurement temperatures, and when the center wavelengths of the transmission band for all the measurement temperatures are obtained, the routine proceeds to step 55.

In step 55, a change amount of the center wavelength is obtained by subtracting the center wavelength of the transmission band at 35° C. from the center wavelength of the transmission band at 50° C., and this change amount is set to the wavelength temperature coefficient at 42.5° C. which is an intermediate between 35° C. and 50° C. Then, the processing similar to the above is performed for the other measurement temperatures, so that the wavelength temperature coefficients at 57.5° C., 72.5° C. and 87.5° C. are calculated. Next table 3 shows a specific example of the wavelength temperature coefficient calculated for each temperature.

TABLE 3

| temperature of VIPA plate [° C.] | center wavelength of transmission band [nm] | wavelength temperature coefficient [nm/° C.] | temperature of wavelength coefficient [° C.] |
|---|---|---|---|
| 35 | 1543.842 | 0.0118 | 42.5 |
| 50 | 1544.019 | 0.0122 | 57.5 |
| 65 | 1544.202 | 0.0128 | 72.5 |
| 80 | 1544.394 | 0.0131 | 87.5 |
| 95 | 1544.591 | — | — |

Figure 9:
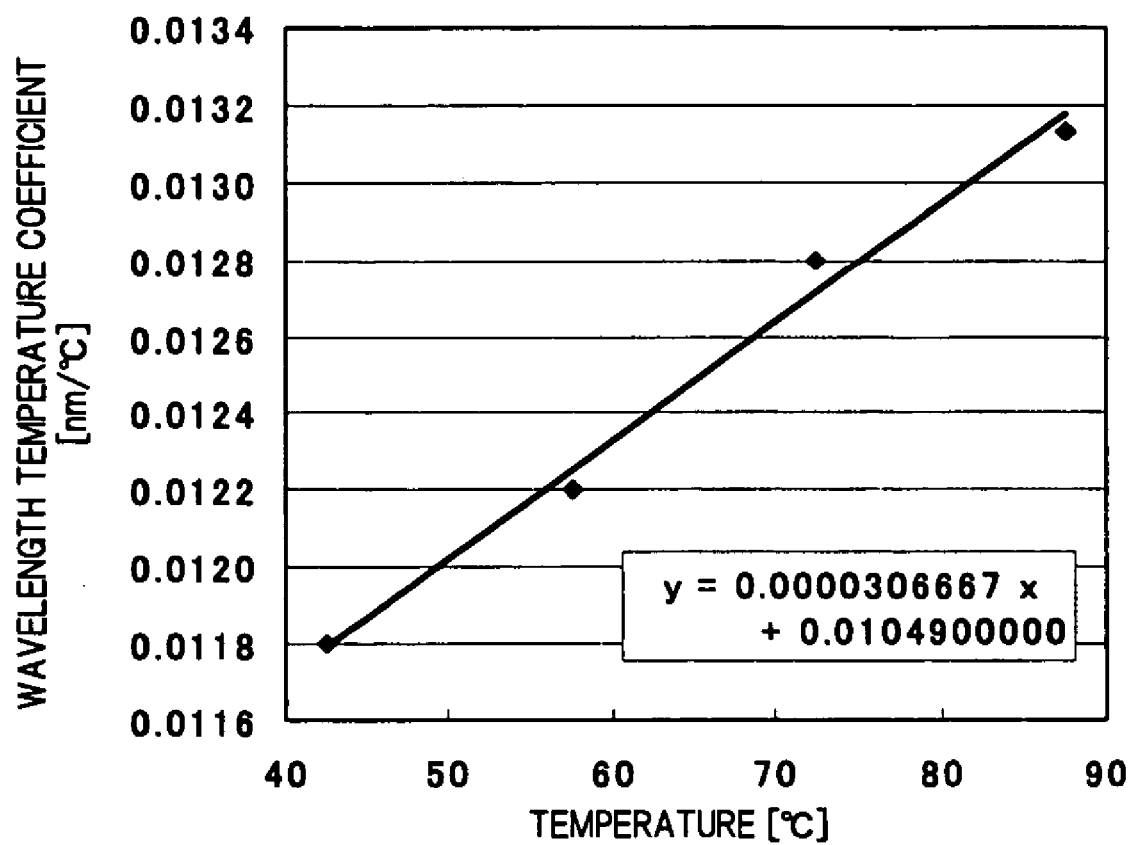
FIG. 9 is a diagram showing one example of the approximation representing the temperature dependence of the wavelength temperature coefficient.

In step 56, as shown in FIG. 9 for example, the data in table 3 is plotted with the temperature as the horizontal axis and the wavelength temperature coefficient as the vertical axis, and an inclination (ShiftA) and an intercept (ShiftB) of the approximation line expressed in the next formula (1) are obtained.

$$d\lambda/dT = \text{Shift}A \times T + \text{Shift}B \quad (1)$$

Note, T represents the temperature of the VIPA plate 1, and λ represents the wavelength. In the graph specifically shown in FIG. 9, ShiftA=0.0000306667 and ShiftB=0.01049. The values of ShiftA and ShiftB are stored in the storage circuit 14 together with the data in table 2, so that the chromatic dispersion tolerance measurement or the chromatic dispersion compensation can be performed on not only the wavelengths on the ITU-T grid but also an arbitrary wavelength between the wavelengths with high accuracy using the present chromatic dispersion generating apparatus.

Next, there will be described specifically an operation of the present embodiment at an operation time.

Figure 10:
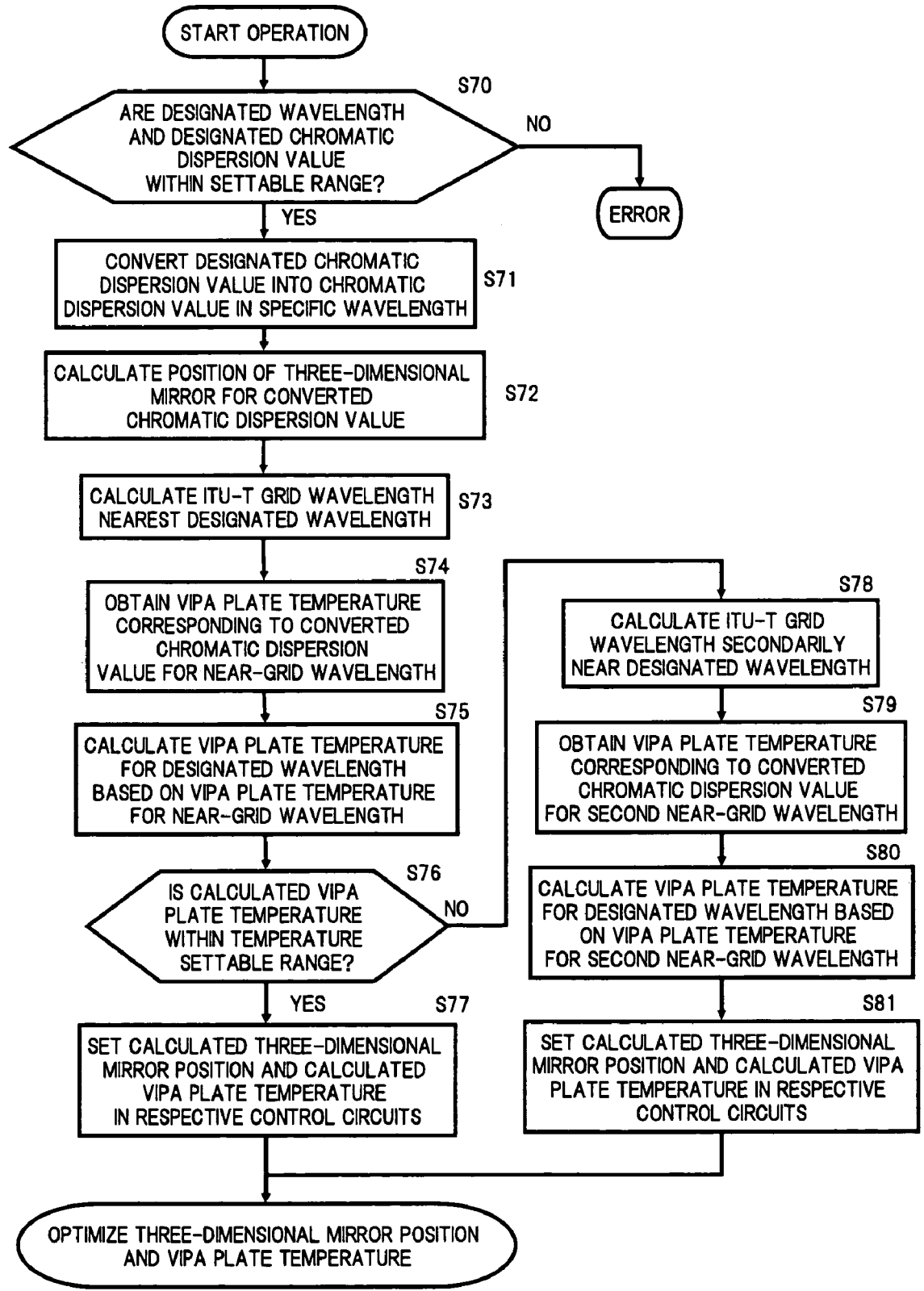
FIG. 10 is a flowchart showing the routine for determining a position of a three-dimensional mirror and the temperature of a VIPA plate, corresponding to a wavelength and a chromatic dispersion value which are designated at an operation time, in the above embodiment.

In the chromatic dispersion generating apparatus, in which the optical characteristic data is previously stored in the storage circuit 14 as described above, when the command for setting the wavelength and the chromatic dispersion value at the operation time is given to the microcomputer 13 via the external communication connector 10A (FIG. 1), the position of the three-dimensional mirror 7 (movable stage 7A) and the temperature of the VIPA plate 1, which correspond to the wavelength and the chromatic dispersion value designated by the setting command, are determined in accordance with a flowchart in FIG. 10 for example.

At first, in step 70 in FIG. 10, it is checked whether or not the designated wavelength and the designated chromatic dispersion value are within the settable range in the present chromatic dispersion generating apparatus. In the case where they are within an appropriate range, the routine proceeds to step 71, while resulting in error if they are outside the settable range.

In step 71, the designated chromatic dispersion value is converted into the chromatic dispersion value in the specific wavelength, using the data of the specific wavelength and the chromatic dispersion slope, which is stored in the storage circuit 14. This conversion of the chromatic dispersion value can be performed in accordance with the next formula (2).

$$D(\lambda_0) = D(\lambda) - DS \cdot (\lambda - \lambda_0) \quad (2)$$

Note, $\lambda_0$ is the specific wavelength, λ is the designated wavelength, D(λ) is the chromatic dispersion value in the wavelength λ, and DS is the chromatic dispersion slope value.

In step 72, for the chromatic dispersion value converted in step 71, the data in table 1 stored in the storage circuit 14 is referred to, and the target position of the three-dimensional mirror 7 is calculated. At this time, in the case where the chromatic dispersion value converted in step 71 is between the setting values in table 1 (respective values set by each 100 ps/nm within the range of ±2000 ps/nm), the position data in table 1 is subjected to the linear interpolation or the like, so that the position of the three-dimensional mirror 7, which corresponds to the chromatic dispersion value after conversion, is obtained. Further, in the case where the chromatic dispersion value converted in step 71 is outside the range in table 1, the position of the three-dimensional mirror 7, which corresponds to the chromatic dispersion value after conversion, is obtained by the extrapolative calculation.

In step 73, the wavelength (to be referred to a near-grid wavelength hereunder) nearest the designated wavelength is obtained from the respective wavelengths on the ITU-T grid.

In step 74, for the near-grid wavelength obtained in step 73, the data in table 2 stored in the storage circuit 14 is referred to, and the temperature of the VIPA plate 1, which corresponds to the chromatic dispersion value converted in step 71, is obtained. At this time, in the case where the chromatic dispersion value converted in step 71 is between the setting values in table 2 (respective values set by each 100 ps/nm within the range of ±2000 ps/nm), the temperature data in table 2 is subjected to the linear interpolation or the like, so that the temperature of the VIPA plate 1, which corresponds to the chromatic dispersion value after conversion, is obtained.

In step 75, the temperature of the VIPA plate 1 for the near-grid wavelength obtained in step 74 is converted into the temperature T of the VIPA plate 1 for the designated wavelength λ, in accordance with a relationship of the following formula (3) which solved the formula (1) for the temperature T using the values of ShiftA and ShiftB stored in the storage circuit 14.

$$T = \frac{-ShiftB + \sqrt{ShiftB^2 - 2 \cdot ShiftA \cdot \left(\lambda g - \frac{ShiftA \cdot Tg^2}{2} - ShiftB \cdot Tg - \lambda\right)}}{ShiftA} \quad (3)$$

Note, λg represents the near-grid wavelength, and Tg represents the temperature of the VIPA plate 1 for the near-grid wavelength.

Figure 11:
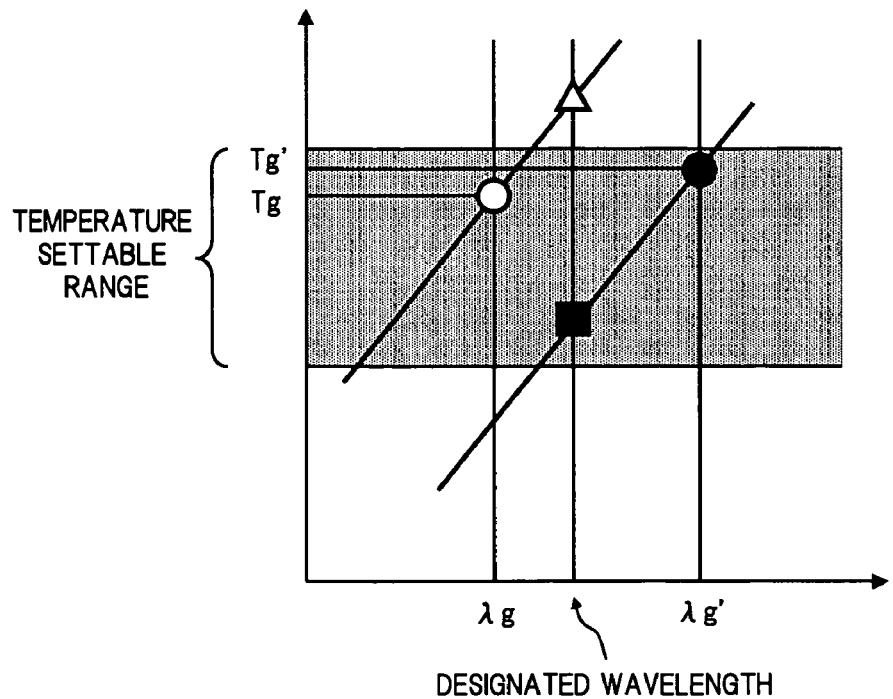
FIG. 11 is a diagram showing one example in which the temperature of the VIPA plate is outside a settable range in the above embodiment.

In step 76, it is judged whether or not the temperature T of the VIPA plate 1 calculated in step 75 in accordance with the relationship of the formula (3) is within the temperature settable range. Here, briefly explaining a state where the post-converted temperature T of the VIPA plate 1 is outside the settable range, as shown in FIG. 11 for example, when the temperature Tg of the VIPA plate 1 for the near-grid wavelength λg is at a position as shown by the white circle mark in the figure based on the data in table 2, if the temperature of the VIPA plate 1 is changed, a relationship between the temperature and the wavelength is represented by an oblique line passing the white circle mark. Therefore, in order to achieve the designated wavelength, the temperature of the VIPA plate 1 needs to be changed to the triangle mark in the figure. However, since the present apparatus is constrained by a component allowable temperature limit and the like, sometimes, the triangle mark is positioned outside the temperature settable range shown by a shaded region in the figure. In such a case, the temperature T of the VIPA plate 1 may be set to the square mark on an oblique line passing the temperature Tg' (black circle mark) of the VIPA plate 1 for a second near-grid wavelength λg' positioned adjacent to the near-grid wavelength.

In the case where it is judged that the temperature T of the VIPA plate 1 is within the temperature settable range, the routine proceeds to step 77, where the position of the three-dimensional mirror 7 calculated in step 72 is set in the movable stage control circuit 11 (FIG. 1) as the target position, and also the temperature of the VIPA plate 1 converted in step 75 is set in the temperature control circuit 12 as the target temperature.

On the other hand, in the case where it is judged that the temperature T of the VIPA plate 1 is outside the temperature settable range, the routine proceeds to step 78, where the second near-grid wavelength shown in FIG. 11 is calculated. Then, in step 79, for the second near-grid wavelength calculated in step 78, the data in table 2 stored in the storage circuit 14 is referred to, and the temperature of the VIPA plate 1, which corresponds to the chromatic dispersion value converted in step 71, is obtained.

In step 80, similarly to step 75, the temperature of the VIPA plate 1 for the second near-grid wavelength is converted into the temperature T of the VIPA plate 1 for the designated wavelength λ, in accordance with the relationship of the formula (3).

In step 81, the position of the three-dimensional mirror 7 calculated in step 72 is set in the movable stage control circuit 11 as the target position, and also the temperature of the VIPA plate 1 converted in step 80 is set in the temperature control circuit 12 as the target temperature.

As described above, the control target values of the movable stage control circuit 11 and the temperature control circuit 12 are set, respectively, so that the position of the three-dimensional mirror 7 and the temperature of the VIPA plate 1 are respectively optimized. Therefore, it becomes possible to achieve the chromatic dispersion value in the designated wavelength with high accuracy.

Figure 12:
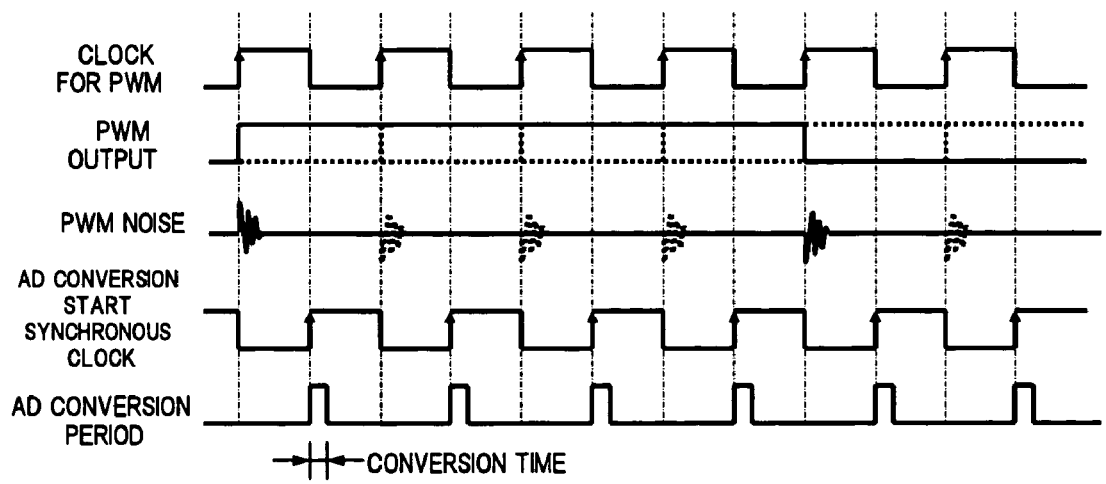
FIG. 12 is a diagram exemplarily showing timing of heater driving and timing of temperature detecting, for stabilizing the temperature control in the above embodiment.

Note, for the temperature control of the VIPA plate 1, in the case where the configuration as shown in FIG. 3 is applied, it is desirable that a noise which is caused when a large current is turned ON/OFF in the PWM amplifier 30 driving the heater, does not influence the detection of the minor change in the resistance value of the temperature sensor 9 due to the temperature change in the VIPA plate 1. To be specific, the ON/OFF timing of the PWM modulation in the PWM controller 30B and the conversion starting timing in the 10 bits ADC 34 are differentiated from each other by the timing controller 35 shown in FIG. 3, so that, as shown in a timing diagram of FIG. 12, after the noise caused at the ON/OFF time of a PWM signal becomes sufficiently low, the AD conversion of a temperature monitor signal is started. As a result, the minor change in the resistance value of the temperature sensor 9 can be detected without practically being influenced by the noise in the PWM signal, so that the temperature of the VIPA plate 1 can be stably controlled to an optimum value. Therefore, it becomes possible to achieve a desired chromatic dispersion value with higher accuracy.

As described above, according to the chromatic dispersion generating apparatus of the present embodiment, as the data for controlling the position of the three-dimensional mirror 7, the positions of the three-dimensional mirror 7 which correspond to at least two chromatic dispersion values for the specific wavelength, and the chromatic dispersion slope value, are stored in the storage circuit 14, and as the data for controlling the temperature of the VIPA plate 1, the temperatures of the VIPA plate 1 which correspond to at least two chromatic dispersion values for the respective wavelengths on the ITU-T grid, and ShiftA and ShiftB, are stored in the storage circuit 14, so that the chromatic dispersion can be performed on an arbitrary wavelength with accuracy. Thus, it is possible to acquire the optical characteristic data prior to the operation in a relatively short time, and also it is possible to provide the chromatic dispersion generating apparatus capable of effectively preventing the capacity of the storage circuit 14 from being enlarged. Such a chromatic dispersion generating apparatus is useful as, for example, a chromatic dispersion compensator with high accuracy capable of coping with an arbitrary wavelength or a chromatic dispersion emulator for the chromatic dispersion tolerance measurement of an optical component, which is used for an arbitrary wavelength.

What is claimed is:

1. A chromatic dispersion generating apparatus comprising: an optical component provided with a demultiplexing function, including a device having two reflective surfaces which are opposed and parallel to each other, in which a light condensed in the one-dimensional direction is incident between the reflective surfaces of said device, and a part of said incident light is transmitted through one of the reflective surfaces while said incident light being multiple-reflected on the reflective surfaces, to be emitted, and said emitted light interferes mutually, so that optical beams traveling directions of which are different from each other according to wavelengths are formed; and a reflector reflecting, at a previously set position, optical beams of respective wavelengths emitted from one of the reflective surfaces of said optical component in different directions to return the optical beams to said optical component, respectively, said chromatic dispersion generating apparatus further comprising:

a storing section that includes a first area which stores, for a specific wavelength among a plurality of wavelengths on a predetermined wavelength grid, data relating to positions of said reflector corresponding to at least two chromatic dispersion values together with said specific wavelength and a chromatic dispersion slope value, and a second area which stores, for the respective wavelengths on said wavelength grid, data relating to the temperatures of said optical component corresponding to at least two chromatic dispersion values together with the respective wavelengths on said wavelength grid and a wavelength temperature coefficient;

a computing section designated with a wavelength and a chromatic dispersion value at an operation time, that computes a target position of said reflector corresponding to said designated wavelength and said designated chromatic dispersion value, based on information stored in the first area of said storing section, and also computes the target temperature of said optical component corresponding to said designated wavelength and said designated chromatic dispersion value, based on information stored in the second area of said storing section;

a position control section that coincides the position of said reflector with the target position computed in said computing section; and a temperature control section that coincides the temperature of said optical component with the target temperature computed in said computing section.

2. A chromatic dispersion generating apparatus according to claim 1, wherein, when said designated wavelength exists between the respective wavelengths on said wavelength grid, said computing section converts said designated chromatic dispersion value into a chromatic dispersion value in said specific wavelength using the chromatic dispersion slope value stored in the first area of said storing section, and thereafter, refers to the data relating to the positions of said reflector stored in the first area of said storing section to obtain the target position of said reflector corresponding to said chromatic dispersion value after conversion.

3. A chromatic dispersion generating apparatus according to claim 2, wherein said computing section sets the wavelength nearest to said designated wavelength, from the respective wavelengths on said wavelength grid, as a near-grid wavelength, refers to the data relating to the temperatures of said optical component stored in the second area of said storing section for said near-grid wavelength, obtains the temperature of said optical component corresponding to said chromatic dispersion value after conversion, and converts said obtained temperature into the temperature corresponding to said designated wavelength using the wavelength temperature coefficient stored in the second area of said storing section, to obtain the target temperature of said optical component.

4. A chromatic dispersion generating apparatus according to claim 3, wherein said storing section stores the approximation representing the temperature dependence of said wavelength temperature coefficient in said second area, and said computing section performs the conversion of the temperature of said optical component corresponding to said designated wavelength using the approximation stored in the second area of said storing section.

5. A chromatic dispersion generating apparatus according to claim 3, wherein, when the temperature of said optical component, which is converted using the wavelength temperature coefficient stored in the second area of said storing section, corresponds to the temperature outside a temperature settable range, said computing section sets the wavelength secondarily near said designated wavelength among the respective wavelengths on said wavelength grid to a second near-grid wavelength, and for said second near-grid wavelength, refers to the data relating to the temperatures of said optical component stored in the second area of said storing section.

6. A chromatic dispersion generating apparatus according to claim 1, wherein said temperature control section includes a heater regulating the temperature of said optical component, a temperature sensor detecting the temperature of said optical component and a controller controlling a drive condition of said heater so that the temperature detected by said temperature sensor is coincident with the target temperature computed in said computing section.

7. A chromatic dispersion generating apparatus according to claim 6, wherein said temperature control section is provided with a timing controller differentiating ON/OFF timing of a drive current for said heater from timing for starting the temperature detection of said optical component, when said heater is driven by a pulse width modulating system.

8. A chromatic dispersion generating apparatus according to claim 1, wherein the chromatic dispersion capable of compensating for the chromatic dispersion accumulated in input optical signals is generated.

9. A chromatic dispersion generating apparatus according to claim 1, wherein the chromatic dispersion capable of measuring the chromatic dispersion tolerance of an optical components to which said apparatus is connected, is generated.

* * * * *